United States Patent
Waki et al.

(10) Patent No.: US 11,359,520 B2
(45) Date of Patent: Jun. 14, 2022

(54) STEAM TURBINE FACILITY AND COMBINED CYCLE PLANT

(71) Applicant: MITSUBISHI POWER, LTD., Yokohama (JP)

(72) Inventors: Yuichiro Waki, Yokohama (JP); Masaomi Makino, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 17/049,669

(22) PCT Filed: Jun. 14, 2019

(86) PCT No.: PCT/JP2019/023605
§ 371 (c)(1),
(2) Date: Oct. 22, 2020

(87) PCT Pub. No.: WO2019/244785
PCT Pub. Date: Dec. 26, 2019

(65) Prior Publication Data
US 2021/0254510 A1    Aug. 19, 2021

(30) Foreign Application Priority Data
Jun. 18, 2018  (JP) .............................. JP2018-115058

(51) Int. Cl.
*F01K 23/10*  (2006.01)
*F01D 25/26*  (2006.01)
*F01K 11/02*  (2006.01)

(52) U.S. Cl.
CPC .............. *F01K 23/10* (2013.01); *F01D 25/26* (2013.01); *F01K 11/02* (2013.01); *F05D 2220/31* (2013.01); *F05D 2260/2322* (2013.01)

(58) Field of Classification Search
CPC .......... F01D 25/16; F01D 25/26; F01K 11/02; F01K 23/10; F01K 7/16; F05D 2220/31; F05D 2260/2322; Y02E 20/16
See application file for complete search history.

(56) References Cited

U.S. PATENT DOCUMENTS 2,823,891 A * 2/1958 Baker ....................... F01D 3/02
                                                415/93
5,152,664 A * 10/1992 Huang ...................... F01D 9/06
                                               415/108

(Continued)

FOREIGN PATENT DOCUMENTS

| EP | 1335110 B1 | 1/2007 |
|----|------------|--------|
| JP | S57-083614 A | 5/1982 |

(Continued)

OTHER PUBLICATIONS

International Search Report dated Aug. 20, 2019, issued in counterpart Application No. PCT/JP2019/023605, with English Translation. (13 pages).

(Continued)

*Primary Examiner* — Jesse S Bogue
(74) *Attorney, Agent, or Firm* — Westerman, Hattori, Daniels & Adrian, LLP (57) ABSTRACT

A steam turbine facility includes a rotor shaft, a pair of radial bearings for rotatably supporting the rotor shaft, a pair of low-pressure turbine blade rows disposed on the rotor shaft in a bearing span of the pair of radial bearings, and a high-pressure turbine blade row and an intermediate-pressure turbine blade row disposed on the rotor shaft in the bearing span and positioned between the pair of low-pressure turbine blade rows.

9 Claims, 4 Drawing Sheets

(56) References Cited

U.S. PATENT DOCUMENTS

| | | | |
|---|---|---|---|
| 6,851,927 B2* | 2/2005 | Klaus | F01D 1/04 |
| | | | 415/116 |
| 2003/0175117 A1* | 9/2003 | Klaus | F01D 1/023 |
| | | | 415/199.4 |
| 2010/0202876 A1 | 8/2010 | Nishimoto et al. | |
| 2011/0158790 A1 | 6/2011 | Sears et al. | |
| 2012/0223532 A1 | 9/2012 | Herzog et al. | |
| 2013/0216354 A1* | 8/2013 | Maruyama | F01D 25/28 |
| | | | 415/14 |
| 2013/0224006 A1* | 8/2013 | Saeki | F01D 3/02 |
| | | | 415/207 |
| 2016/0047307 A1* | 2/2016 | Williamson | F01K 23/18 |
| | | | 290/52 |
| 2021/0180468 A1* | 6/2021 | Barb | F01D 9/04 |
| 2021/0215068 A1* | 7/2021 | Makino | F01K 23/16 |
| 2021/0254510 A1* | 8/2021 | Waki | F01K 23/10 |

FOREIGN PATENT DOCUMENTS

| | | |
|---|---|---|
| JP | S62-182403 A | 8/1987 |
| JP | H04-123305 U | 11/1992 |
| JP | H06-193408 A | 7/1994 |
| JP | H07-158410 A | 6/1995 |
| JP | H08-177409 A | 7/1996 |
| JP | 2003-239704 A | 8/2003 |
| JP | 3529412 B2 | 5/2004 |
| JP | 2004-169562 A | 6/2004 |
| JP | 2006-312885 A | 11/2006 |
| JP | 2011-137449 A | 7/2011 |
| JP | 2012-057615 A | 3/2012 |
| JP | 4898955 B2 | 3/2012 |
| WO | 2014/038080 A1 | 3/2014 |

OTHER PUBLICATIONS

Notification of Transmittal of Translation of the International Preliminary Report on Patentability (Form PCT/IB/338) issued in counterpart International Application No. PCT/JP2019/023605 dated Dec. 30, 2020 with Forms PCT/IB/373 and PCT/ISA/237. (21 pages).

Office Action dated Nov. 30, 2021, issued in counterpart JP application No. 2018-115058, with English Translation. (7 pages).

Office Action dated Feb. 22, 2022, issued in counterpart DE application No. 11 2019 001 682.2. (6 pages).

* cited by examiner

STEAM TURBINE FACILITY AND COMBINED CYCLE PLANT

TECHNICAL FIELD

The present disclosure relates to a steam turbine facility and a combined cycle plant.

BACKGROUND

As a steam turbine used in a combined cycle plant or the like, a steam turbine which includes a high-pressure turbine, an intermediate-pressure turbine, and a low-pressure turbine driven by steams having different pressure levels may be used.

Patent Document 1 discloses, as a steam turbine for a single-shaft combined cycle plant, a steam turbine which includes a high-pressure turbine, an intermediate-pressure turbine, and a double-flow exhaust type low-pressure turbine. In this steam turbine, the high-pressure turbine and the intermediate-pressure turbine, and the low-pressure turbine are accommodated in separate casings, and steam from the intermediate-pressure turbine is introduced to the low-pressure turbine via a cylinder connecting pipe for connecting these casings.

Meanwhile, Patent Document 1 also discloses a configuration where, in the steam turbine for the single-shaft combined cycle plant, the high-pressure turbine, the intermediate-pressure turbine, and the low-pressure turbine are accommodated in a single casing, and a single-flow exhaust type low-pressure turbine is adopted.

CITATION LIST

Patent Literature

Patent Document 1: JP3529412B

SUMMARY

Technical Problem

As compared with a case in which a casing for the high-pressure turbine and an intermediate-pressure turbine and a casing for a low-pressure turbine are disposed separately, in a steam turbine with a single casing where the high-pressure turbine, the intermediate-pressure turbine, and the low-pressure turbine are accommodated in a single casing, a cylinder connecting pipe for connecting the casings is not needed, and in addition, a bearing and the like disposed between the casings can be cut. Thus, it is possible to shorten the total length of the steam turbine. Accordingly, adopting the steam turbine with the single casing, it is possible to simplify the configuration and also to reduce an installation space. Thus, it is possible to reduce a facility cost.

Meanwhile, in the single-flow exhaust type low-pressure turbine, in order to deal with an increase in volume flow rate of steam, it is necessary to increase the length of a blade in a final stage, in particular, as compared with a case of a double-flow exhaust type low-pressure turbine. However, it is difficult to ensure the strength of a turbine blade, as the length of the turbine blade is increased. In the present situation, it is difficult to apply the configuration of the single casing and the single-flow exhaust to a high-power steam turbine.

In view of the above, an object of at least one embodiment of the present invention is to provide a steam turbine facility capable of dealing with high output power and a combined cycle plant including the same, while reducing a facility cost.

Solution to Problem (1) A steam turbine facility according to at least one embodiment of the present invention includes a rotor shaft, a pair of radial bearings for rotatably supporting the rotor shaft, a pair of low-pressure turbine blade rows disposed on the rotor shaft in a bearing span of the pair of radial bearings, and a high-pressure turbine blade row and an intermediate-pressure turbine blade row disposed on the rotor shaft in the bearing span and positioned between the pair of low-pressure turbine blade rows.

With the above configuration (1), since the high-pressure turbine blade row, the intermediate-pressure turbine blade row, and the pair of low-pressure turbine blade rows are disposed in the bearing span of the pair of radial bearings, and the high-pressure turbine blade row and the intermediate-pressure turbine blade are arranged between the pair of low-pressure turbine blade rows, it is possible to accommodate the high-pressure turbine blade row, the intermediate-pressure turbine blade row, and the pair of low-pressure turbine blade rows in the single casing, and to implement a double-flow exhaust type where steams are exhausted from a pair of low-pressure turbines.

That is, with the single casing structure where the high-pressure turbine blade row, the intermediate-pressure turbine blade row, and the pair of low-pressure turbine blade rows are accommodated in the single casing, for example, it is possible to cut a cylinder connecting pipe for connecting casings, a bearing disposed between the casings, and the like, and to simplify the configuration or reduce an installation space of the steam turbine facility. Moreover, with the double-flow exhaust type including the pair of low-pressure turbines, it is possible to suppress a decrease in strength of a turbine blade of each of the low-pressure turbines by suppressing an increase in length of the turbine blade. Thus, it is possible to deal with a steam turbine facility of high output power. Thus, with the above configuration (1), it is possible to implement the steam turbine facility capable of dealing with high output power, while reducing the facility cost.

(2) In some embodiments, in the above configuration (1), the steam turbine facility further includes a branched channel for introducing a part of steam flowing through a first low-pressure turbine blade row which is one of the pair of low-pressure turbine blade rows to an inlet of a second low-pressure turbine blade row which is the other of the pair of low-pressure turbine blade rows.

With the above configuration (2), since the part of the steam flowing through the first low-pressure turbine blade row of the pair of low-pressure turbine blade rows is introduced to the inlet of the second low-pressure turbine blade row via the branched channel, it is possible to discharge the steams from both the pair of low-pressure turbine blade rows, that is, it is possible to implement the double-flow type steam turbine facility where the steams are exhausted from the pair of low-pressure turbines.

(3) In some embodiments, in the above configuration (2), the steam turbine facility further includes an inner casing for accommodating the high-pressure turbine blade row and the intermediate-pressure turbine blade row, and an outer casing for accommodating the inner casing and at least a part of the pair of low-pressure turbine blade rows. The branched channel is formed at least partially by an outer circumferential surface of the inner casing and an inner circumferential surface of the outer casing.

With the above configuration (3), since the high-pressure turbine blade row, the intermediate-pressure turbine blade row, and the pair of low-pressure turbine blade rows are accommodated in the outer casing, and the branched channel is formed by using the outer casing and the inner casing positioned on the inner side of the outer casing, it is possible to implement the steam turbine facility of the double-flow exhaust type and with the single casing structure, by the simple configuration. Thus, as described in the above configuration (1), it is possible to implement the steam turbine facility capable of dealing with high output power, while reducing the facility cost.

(4) In some embodiments, in the above configuration (3), an insulator is disposed on the outer circumferential surface of the inner casing.

With the above configuration (4), since the insulator is disposed on the outer circumferential surface of the inner casing, it is possible to suppress heat dissipation from the inner casing of a relatively high temperature, where the high-pressure turbine blade row and the intermediate-pressure turbine blade row are accommodated, to the branched channel where steam of relatively low temperature flows. Thus, it is possible to suppress an efficiency decrease of the steam turbine facility caused by such heat dissipation.

Note that in some embodiments, an insulator may be disposed on the inner circumferential surface of the outer casing.

(5) In some embodiments, in the above configuration (2), the steam turbine facility further includes an inner casing for accommodating the high-pressure turbine blade row and the intermediate-pressure turbine blade row, and an outer casing for accommodating the inner casing and at least a part of the pair of low-pressure turbine blade rows. The branched channel is formed at least partially by a pipe passing outside the outer casing.

With the above configuration (5), since the high-pressure turbine blade row, the intermediate-pressure turbine blade row, and the pair of low-pressure turbine blade rows are accommodated in the outer casing, and the branched channel is formed by the pipe passing outside the outer casing, it is possible to implement the steam turbine facility of the double-flow exhaust type and with the single casing structure, by the simple configuration. Thus, as described in the above configuration (1), it is possible to implement the steam turbine facility capable of dealing with high output power, while reducing the facility cost.

(6) In some embodiments, in any one of the above configurations (2) to (5), the steam turbine facility further includes a steam introduction path connected to the branched channel, for introducing steam having a pressure lower than a pressure of steam in an inlet of the first low-pressure turbine blade row.

In the above configuration (6), since the above-described steam introduction path connected to the branched channel is provided, the steam with the lower pressure introduced from the steam introduction path to the branched channel is introduced to the second low-pressure turbine blade row via the branched channel, in addition to a part of steam flowing into the inlet of the first low-pressure turbine blade row (for example, exhaust air from the intermediate-pressure turbine, or steam from a low-pressure drum or a low-pressure evaporator of a boiler). Therefore, with the above configuration (6), it is possible to improve output power of the steam turbine facility.

(7) In some embodiments, in any one of the above configurations (1) to (6), the steam turbine is configured such that steam flowing through the high-pressure turbine blade row and steam flowing through the intermediate-pressure turbine blade row flow in opposite directions to each other in an axial direction, and the steam turbine is configured such that steams flowing through the pair of low-pressure turbine blade rows, respectively, flow in opposite directions to each other in the axial direction.

With the above configuration (7), since the respective turbine blade rows are disposed such that the steam flowing through the high-pressure turbine blade row and the steam flowing through the intermediate-pressure turbine blade row flow in the opposite directions to each other in the axial direction, and the steams flowing through the pair of low-pressure turbine blade rows, respectively, flow in the opposite directions to each other in the axial direction, it is possible to balance a thrust load acting on the rotor shaft.

(8) In some embodiments, in any one of the above configurations (1) to (7), the steam turbine facility further includes an exhaust chamber for discharging steams from the pair of low-pressure turbine blade rows toward a condenser. The exhaust chamber has an exhaust chamber outlet disposed on a lateral side thereof.

With the above configuration (8), the steam having passed through the low-pressure turbine blade row is laterally exhausted toward the condenser via the exhaust chamber outlet disposed on the lateral side of the exhaust chamber. That is, since the condenser can be disposed on the lateral side of the exhaust chamber, it is possible to reduce the size of the steam turbine facility in the height direction, as compared with a case in which the condenser is positioned below the exhaust chamber. Therefore, it is possible to reduce the facility cost of the steam turbine facility more effectively.

(9) In some embodiments, in any one of the above configurations (1) to (8), the steam turbine facility further includes a condenser for condensing steams from the pair of low-pressure turbine blade rows.

With the above configuration (9), since the high-pressure turbine blade row, the intermediate-pressure turbine blade row, and the pair of low-pressure turbine blade rows are disposed in the bearing span of the pair of radial bearings, and the high-pressure turbine blade row and the intermediate-pressure turbine blade are arranged between the pair of low-pressure turbine blade rows, it is possible to accommodate the high-pressure turbine blade row, the intermediate-pressure turbine blade row, and the pair of low-pressure turbine blade rows in the single casing, and to implement the double-flow exhaust type where steams are exhausted from the pair of low-pressure turbines. Thus, as described in the above configuration (1), it is possible to simplify the configuration or reduce the installation space of the steam turbine facility, and to deal with the steam turbine facility of high output power. Thus, with the above configuration (9), it is possible to implement the steam turbine facility capable of dealing with high output power, while reducing the facility cost.

(10) A combined cycle plant according to at least one embodiment of the present invention includes a gas turbine facility, a boiler for generating steam by heat of a discharged gas from the gas turbine facility, and the steam turbine facility according to any one of the above configurations (1)

to (9). The steam turbine facility is configured to be driven by the steam generated by the boiler.

With the above configuration (10), since the high-pressure turbine blade row, the intermediate-pressure turbine blade row, and the pair of low-pressure turbine blade rows are disposed in the bearing span of the pair of radial bearings, and the high-pressure turbine blade row and the intermediate-pressure turbine blade are arranged between the pair of low-pressure turbine blade rows, it is possible to accommodate the high-pressure turbine blade row, the intermediate-pressure turbine blade row, and the pair of low-pressure turbine blade rows in the single casing, and to implement the double-flow exhaust type where steams are exhausted from the pair of low-pressure turbines. Thus, as described in the above configuration (1), it is possible to simplify the configuration or reduce the installation space of the steam turbine facility, and to deal with the steam turbine facility of high output power. Thus, with the above configuration (10), it is possible to implement the steam turbine facility capable of dealing with high output power, while reducing the facility cost.

Advantageous Effects

According to at least one embodiment of the present invention, a steam turbine facility capable of dealing with high output power and a combined cycle plant including the same are provided, while reducing a facility cost.

DETAILED DESCRIPTION

Some embodiments of the present invention will be described below with reference to the accompanying drawings. It is intended, however, that unless particularly identified, dimensions, materials, shapes, relative positions and the like of components described in the embodiments or shown in the drawings shall be interpreted as illustrative only and not intended to limit the scope of the present invention.

First, a combined cycle plant, to which a steam turbine facility is applied, according to some embodiments will be described with reference to FIG. 1.

Figure 1:
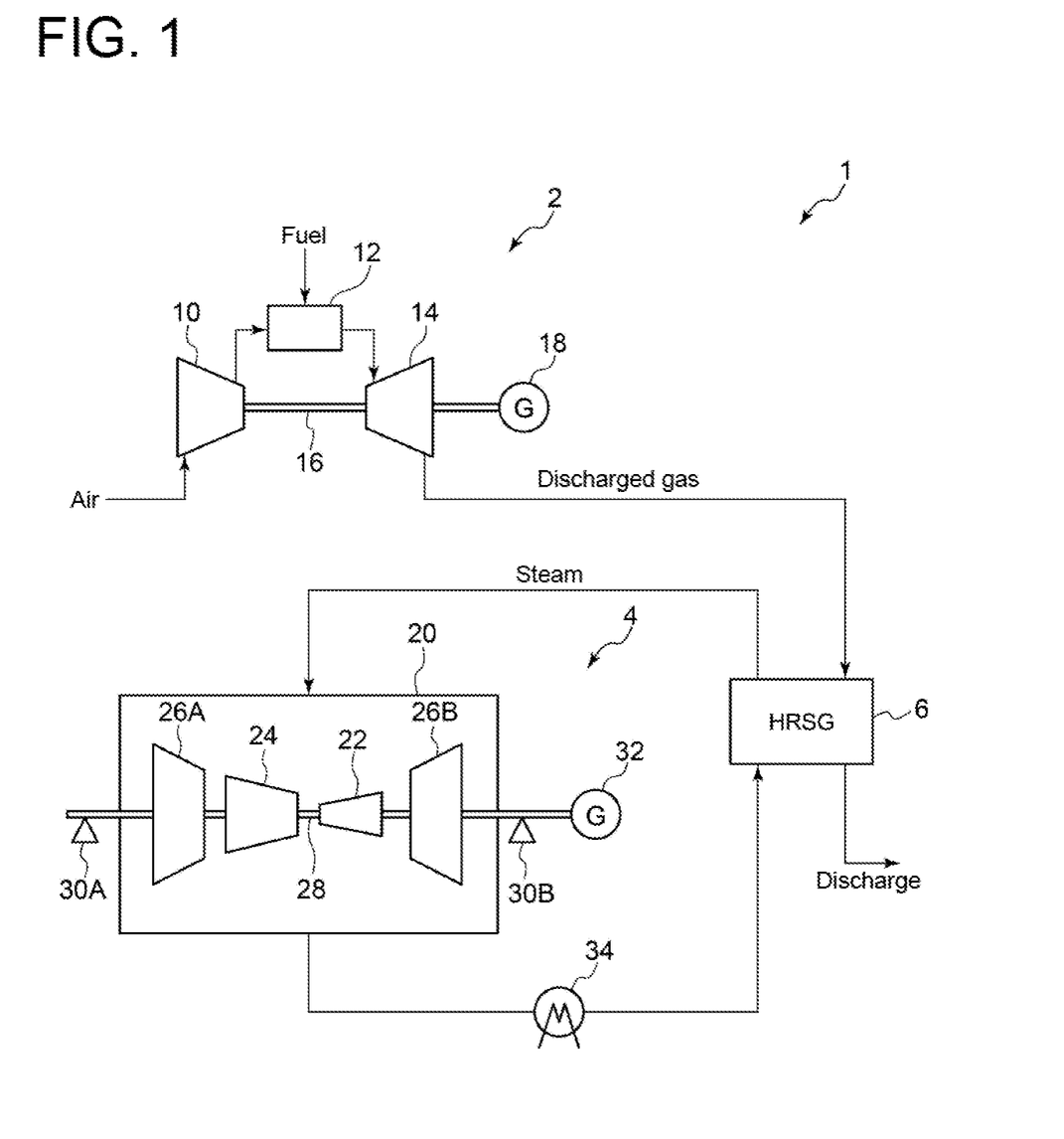
FIG. 1 is a schematic configuration diagram of a combined cycle plant according to an embodiment.

FIG. 1 is a schematic configuration diagram of the combined cycle plant according to an embodiment. As shown in the diagram, a combined cycle plant 1 is a gas turbine combined cycle (GTCC) plant including a gas turbine facility 2, a heat recovery steam generator (HRSG) 6 (boiler), and a steam turbine facility 4.

The gas turbine facility 2 shown in FIG. 1 includes a compressor 10, a combustor 12, and a turbine 14. The compressor 10 is configured to compress air to produce compressed air. The combustor 12 is configured to generate a combustion gas by a combustion reaction between the compressed air from the compressor 10 and a fuel (for example, a natural gas or the like). The turbine 14 is configured to be rotary driven by the combustion gas from the combustor 12. The turbine 14 is connected to a generator 18 via a rotational shaft 16. The generator 18 is driven by rotational energy of the turbine 14 to generate electric power. The combustion gas having finished work in the turbine 14 is discharged from the turbine 14 as a discharged gas.

The heat recovery steam generator 6 is configured to generate steam by heat of the discharged gas from the gas turbine facility 2.

The heat recovery steam generator 6 includes a duct (not shown) to which the discharged gas from the gas turbine facility 2 is introduced and a heat exchanger (not shown) disposed so as to pass inside the duct. Into the heat exchanger, condensate water from a condenser 34 of the steam turbine facility 4 to be described later is introduced. In the heat exchanger, steam is generated by heat exchange between the condensate water and the discharged gas flowing through the above-described duct.

Note that the discharged gas having flown through the duct of the heat recovery steam generator 6 and passed through the heat exchanger may be discharged from a stack (not shown).

The steam turbine facility 4 shown in FIG. 1 includes a plurality of turbine blade rows 22, 24, 26A, 26B and is configured to be driven by the steam from the heat recovery steam generator 6.

The steam generated by the heat recovery steam generator 6 is introduced to the steam turbine facility 6. The steam turbine facility 6 is rotary driven by the steam. Moreover, the steam turbine facility 6 is connected to a generator 32 via a rotor shaft 28. The generator 32 is rotary driven by the steam turbine facility 6 to generate electric power.

The steam turbine facility 4 according to some embodiments will be described below in more detail.

Figure 2:
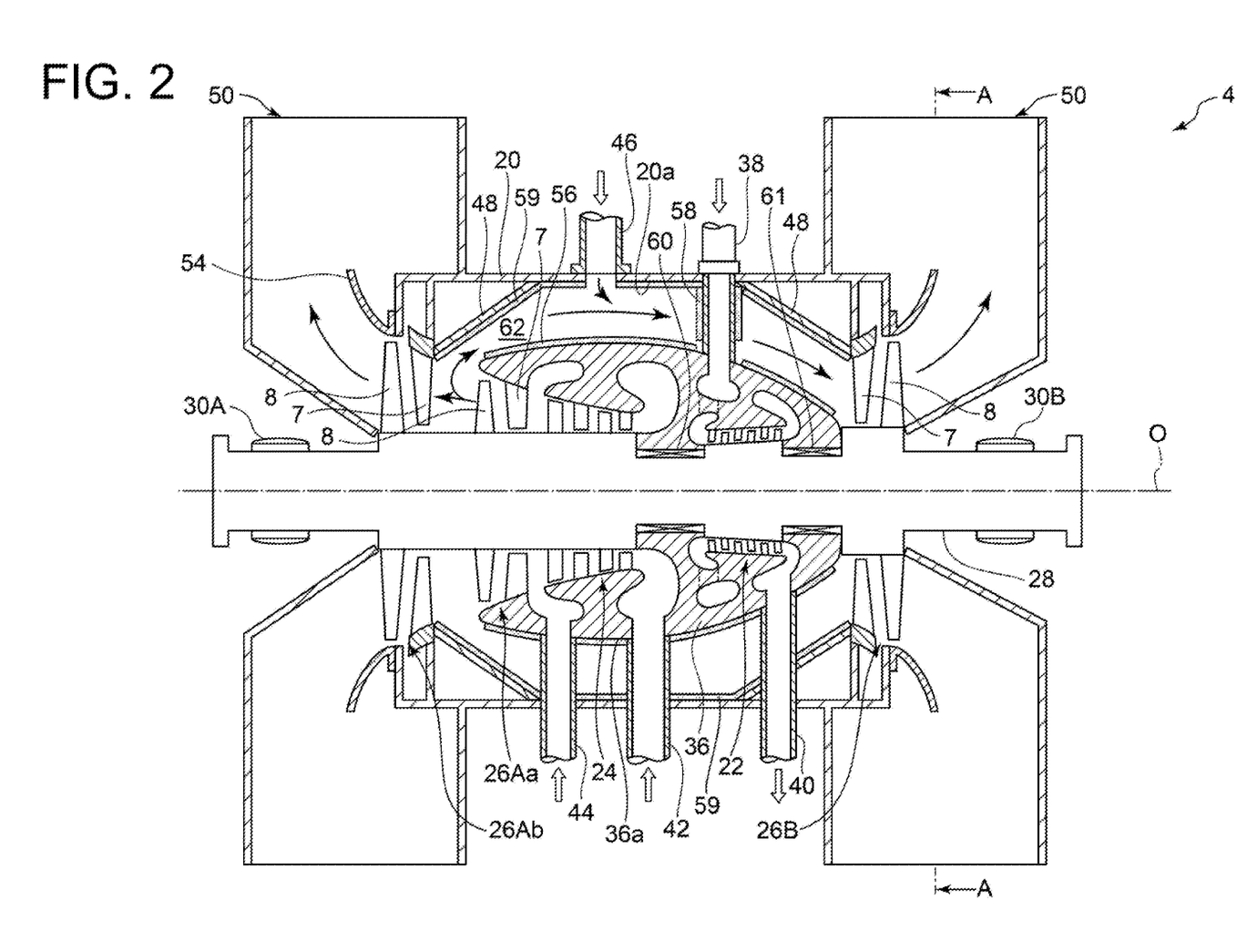
FIG. 2 is a schematic cross-sectional view of a steam turbine facility according to an embodiment, taken along its axial direction.
Figure 3:
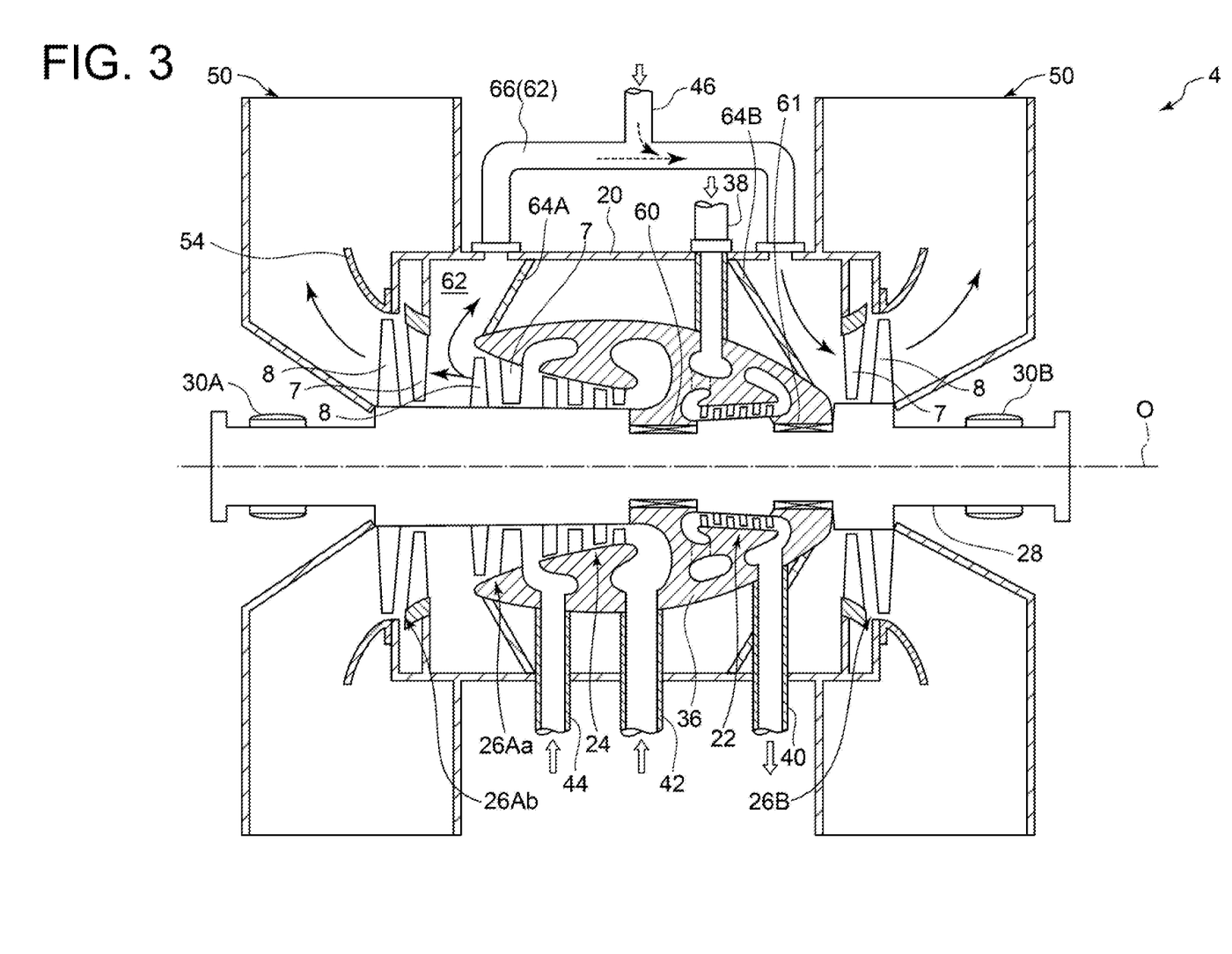
FIG. 3 is a schematic cross-sectional view of the steam turbine facility according to an embodiment, taken along its axial direction.

FIGS. 2 and 3 are each a schematic cross-sectional view of the steam turbine facility 4 according to an embodiment, taken along its axial direction. The embodiment shown in FIG. 2 and the embodiment shown in FIG. 3 basically have the same structure, except for a branched channel 62 to be described later.

As shown in FIGS. 1 to 3, the steam turbine facility 4 includes the rotor shaft 28, a pair of radial bearings 30A, 30B for rotatably supporting the rotor shaft 28, the turbine blade rows 22, 24, 26A, 26B disposed on the rotor shaft 28, and an outer casing 20 and an inner casing 36.

The above-described turbine blade rows include the high-pressure turbine blade row 22 where high-pressure steam from a boiler (such as the above-described heat recovery steam generator) is introduced, the intermediate-pressure turbine blade row 24 where steam of a lower pressure (intermediate-pressure steam) is introduced, and the pair of low-pressure turbine blade rows 26A, 26B where steam of a further lower pressure (low-pressure steam) is introduced.

The high-pressure turbine blade row 22 and the intermediate-pressure turbine blade row 24 are positioned between the pair of turbine blade rows 26A, 26B in the axial direction.

The pair of low-pressure turbine blade rows 26A, 26B include the first low-pressure turbine blade row 26A disposed adjacent to the intermediate-pressure turbine blade row 24 in the axial direction and the second low-pressure turbine blade row 26B disposed adjacent to the high-pressure turbine blade row 22 in the axial direction.

The pair of low-pressure turbine blade rows 26A, 26B are disposed in a bearing span of the above-described pair of radial bearings 30A, 30B. That is, the pair of low-pressure turbine blade rows 26A, 26B, and the high-pressure turbine blade row 22 and the intermediate-pressure turbine blade row 24 positioned between the pair of low-pressure turbine blade rows 26A, 26B are disposed in the bearing span of the pair of radial bearings 30A, 30B.

Note that any other radial bearing is not disposed in the bearing span of the pair of radial bearings 30A, 30B (that is, between the radial bearing 30A and the radial bearing 30B) in the axial direction.

In the exemplary embodiments shown in FIGS. 2 and 3, the high-pressure turbine blade row 22 and the intermediate-pressure turbine blade row 24 are accommodated in the inner casing 36, and an upstream portion 26Aa of the first low-pressure turbine blade row 26A is also accommodated in the inner casing 36. Moreover, a downstream portion 26Ab of the first low-pressure turbine blade row 26A and the second low-pressure turbine blade row 26B are accommodated in the outer casing 20.

That is, each of the turbine blade rows 22, 24, 26A, 26B of the steam turbine facility 4 is disposed inside the outer casing 20.

Each of the turbine blade rows 22, 24, 26A, 26B includes a plurality of stator vanes 7 and rotor blades 8. The plurality of stator vanes 7 and rotor blades 8 are arranged in the circumferential direction to form rows, respectively. The rows of the stator vanes 7 and the rows of the rotor blades 8 are arranged alternately in the axial direction.

Note that each of the turbine blade rows 22, 24, 26A, 26B may include a plurality of sets of rows of the stator vanes 7 and rows of the rotor blades 8.

The stator vanes 7 of each of the turbine blade rows 22, 24, 26A, 26B are supported by the inner casing 36 or the outer casing 20 serving as a stationary member.

In the exemplary embodiments shown in FIGS. 2 and 3, the stator vanes 7 of the high-pressure turbine blade row 22 and the intermediate-pressure turbine blade row 24 are supported by the inner casing 36. Moreover, the upstream portion 26Aa of the first low-pressure turbine blade row 26A of the pair of low-pressure turbine blade rows 26A, 26B is accommodated in the inner casing 36, and the downstream portion 26Ab of the first low-pressure turbine blade row 26A and the second low-pressure turbine blade row 26B are accommodated in the outer casing.

Moreover, the rotor blades 8 of each of the turbine blade rows 22, 24, 26A, 26B are mounted on the rotor shaft 28 and rotate with the rotor shaft 28.

The inlets of the high-pressure turbine blade row 22, the intermediate-pressure turbine blade row 24, and the first low-pressure turbine blade row 26A are, respectively, connected to a high-pressure inlet pipe 38, an intermediate-pressure inlet pipe 42, and a low-pressure inlet pipe 44. Moreover, the outlet of the high-pressure turbine blade row 22 is connected to a high-pressure outlet pipe 40.

High-pressure steam, intermediate-pressure steam, and low-pressure steam are introduced to the inlets of the high-pressure turbine blade row 22, the intermediate-pressure turbine blade row 24, and the first low-pressure turbine blade row 26A via the high-pressure inlet pipe 38, the intermediate-pressure inlet pipe 42, and the low-pressure inlet pipe 44, respectively.

The steams introduced to the respective turbine blade rows via the high-pressure inlet pipe 38, the intermediate-pressure inlet pipe 42, and the low-pressure inlet pipe 44 may be the steams generated by the boiler described above. Moreover, the steam having passed through the high-pressure turbine blade row 22 and discharged from the high-pressure outlet pipe 40 may be re-heated by a re-heater or the like, and then may be introduced to the intermediate-pressure turbine blade row 24 via the intermediate-pressure inlet pipe 42. Moreover, as shown in FIGS. 2 and 3, the steam having passed through the intermediate-pressure turbine blade row 24 may directly flow into the inlet of the first low-pressure turbine blade row 26A, and in addition, the steam from the intermediate-pressure turbine blade row 24 and the steam from the low-pressure inlet pipe 44 may interflow into the inlet of the first low-pressure turbine blade row 26A.

Note that a seal part for suppressing fluid leakage may be disposed between the rotor shaft 28 and the inner casing 36 in the radial direction. For example, as shown in FIGS. 2 and 3, a seal part 60 for suppressing fluid leakage between the high-pressure turbine blade row 22 and the intermediate-pressure turbine blade row 24, and a seal part 61 for suppressing fluid leakage between the high-pressure turbine blade row 22 and the second low-pressure turbine blade row 26B may be disposed.

The steam turbine facility 4 shown in FIGS. 2 and 3 includes the branched channel 62 disposed so as to branch from a steam channel where the stator vanes 7 and the rotor blades 8 are disposed alternately along the axial direction. The branched channel 62 is disposed so as to branch from the above-described steam channel at a position (branch point) between the upstream portion 26Aa and the downstream portion 26Ab of the first low-pressure turbine blade row 26A, in the axial direction. A part of the steam flowing through the first low-pressure turbine blade row 26A is introduced to the inlet of the second low-pressure turbine blade row 26B via the branched channel 62.

Note that the number of stages of the second low-pressure turbine blade rows (the number of sets of rows of the stator vanes 7 and rows of the rotor blades 8) may be the same as the number of stages of the downstream portion 26Ab of the first low-pressure turbine blade row downstream of the above-described branch point. In the exemplary embodiments shown in FIGS. 2 and 3, the number of stages of the downstream portion 26Ab of the first low-pressure turbine blade row and the number of stages of the second low-pressure turbine blade row is one.

In such a steam turbine facility 4, if steam is introduced to each of the turbine blade rows 22, 24, 26A, 26B, the steam expands and increases in speed when passing through the stator vanes 7, performs work on the rotor blades 8, and rotates the rotor shaft 28.

The steam turbine facility 4 also includes a pair of exhaust chambers 50. The pair of exhaust chambers 50 are disposed to be positioned downstream of the pair of low-pressure turbine blade rows 26A, 26B, respectively. The steams having passed through the pair of low-pressure turbine blade rows 26A, 26B are guided by a flow guide 54 to flow into the exhaust chambers 50, pass inside the exhaust chambers 50, respectively, and are discharged via an exhaust chamber outlet 51 (see FIG. 4) disposed on each of the exhaust chambers 50.

The condenser 34 (see FIG. 1) is disposed downstream of the exhaust chamber outlet 51. The steam discharged from the exhaust chamber outlet 51 flows into the condenser 34. In the condenser 34, the steam is cooled by heat exchange with cooling water to be condensed, generating condensed water (condensate water).

In some embodiments, the exhaust chamber outlet 51 may be disposed on the lower side of the exhaust chamber 50, and the condenser 34 may be disposed below the exhaust chamber. Alternatively, in some embodiments, the exhaust chamber outlet 51 may be disposed on the lateral side of the exhaust chamber 50, and the condenser 34 may be disposed on the lateral side of the exhaust chamber 50.

In the above-described steam turbine facility 4, the high-pressure turbine blade row 22, the intermediate-pressure turbine blade row 24, and the pair of low-pressure turbine blade rows 26A, 26B are disposed in the bearing span of the pair of radial bearings 30A, 30B, and the high-pressure turbine blade row 22 and the intermediate-pressure turbine blade row 24 are arranged between the pair of low-pressure turbine blade rows 26A, 26B. With this configuration, it is possible to accommodate the high-pressure turbine blade row 22, the intermediate-pressure turbine blade row 24, and the pair of low-pressure turbine blade rows 26A, 26B in a single casing (outer casing 20), and it is also possible to implement a double-flow exhaust type steam turbine facility where steams are discharged via the pair of low-pressure turbine blade rows 26A, 26B, respectively.

That is, with the single casing structure where the high-pressure turbine blade row 22, the intermediate-pressure turbine blade row 24, and the pair of low-pressure turbine blade rows 26A, 26B are accommodated in the single casing (outer casing 20), for example, it is possible to cut a cylinder connecting pipe for connecting casings and gland seals disposed between the turbine blade rows, and to simplify the configuration or reduce an installation space of the steam turbine facility 4. Moreover, with the double-flow exhaust type including the pair of low-pressure turbine blade rows 26A, 26B, it is possible to suppress a decrease in strength of a turbine blade of each of the low-pressure turbines by suppressing an increase in length of the turbine blade, allowing the steam turbine facility 4 to deal with a large-capacity steam generation device (such as a boiler). Moreover, since the turbine blade of the low-pressure turbine can relatively be shortened by suppressing the increase in length of the turbine blade, a leaving loss that can be caused in the final-stage blade of the low-pressure turbine is reduced, making it possible to improve turbine performance.

Thus, according to the above-described steam turbine facility 4, it is possible to deal with the large-capacity steam generation device (such as the boiler) while reducing a facility cost.

Moreover, in the above-described steam turbine facility 4, since the part of the steam flowing through the first low-pressure turbine blade row 26A is introduced to the inlet of the second low-pressure turbine blade row 26B via the branched channel 62, it is possible to discharge the steams from both the pair of low-pressure turbine blade rows 26A, 26B, that is, it is possible to implement the double-flow type steam turbine facility 4.

In the exemplary embodiment shown in FIG. 2, the branched channel 62 is an annular channel formed at least partially by an outer circumferential surface 36a of the inner casing 36 and an inner circumferential surface 20a of the outer casing 20.

Thus forming the branched channel 62 by using the outer casing 20 and the inner casing 36, it is possible to implement the steam turbine facility 4 of the double-flow exhaust type and with the single casing structure, by the simple configuration.

In addition, since the branched channel 62 is the annular channel, it is easy to ensure a large area of the branched channel 62.

The outer casing 20 may be produced from sheet metal. Moreover, the inner casing 36 may be produced as a casting.

The steam flowing through the branched channel 62 disposed to branch from the middle of the low-pressure turbine blade row 26A has a relatively low temperature. A difference between a pressure of this steam having a relatively low pressure and a pressure (typically, the atmospheric pressure) outside the outer casing 20 is relatively small, making it possible to have a required strength even if the outer casing 20 is produced from the sheet metal. Thus, producing the outer casing 20 from the sheet metal, it is possible to implement the steam turbine facility 4 of the double-flow exhaust type and with the single casing structure described above at a relatively low cost, while having the strength required as the steam turbine facility 4.

In the embodiment shown in FIG. 2, guide members 48 for guiding the flow of steam in the branched channel 62 are disposed radially inner side of the outer casing 20 and radially outer side of the inner casing 36. The guide members 48 are disposed obliquely with respect to the axial direction of the steam turbine facility 4 to be gradually distanced from a center axis O of the rotor shaft 28 toward a center position between the pair of low-pressure turbine blade rows 26A, 26B, in the axial direction.

Moreover, in the embodiment shown in FIG. 2, the outer circumferential surface 36a of the inner casing 36 has a smooth shape including a convex curve protruding radially outward, in a cross-section along the axial direction.

Disposing the above-described guide members 48 or forming the outer circumferential surface 36a of the inner casing 36 into the smooth shape as described above, it is possible to reduce turbulence of a steam flow in the branched channel 62, and thus to reduce a fluid loss.

An insulator may be disposed on the member forming the branched channel 62 or the surface of a member disposed in the branched channel 62. For example, in the embodiment shown in FIG. 2, an insulator 56 is disposed on the outer circumferential surface 36a of the inner casing 36 forming the branched channel 62. Moreover, an insulator 58 is disposed in a portion of the high-pressure inlet pipe 38 passing through the branched channel 62. In addition, as shown in FIG. 2, an insulator 59 may be disposed on the inner circumferential surface 20a of the outer casing 20 forming the branched channel 62.

Disposing the above-described insulators, it is possible to suppress heat dissipation from the inner casing 36, the high-pressure inlet pipe 38, and the like where steam of a relatively high temperature flows to the branched channel 62 where steam of relatively low temperature flows. Thus, it is possible to suppress an efficiency decrease of the steam turbine facility 4 caused by such heat dissipation.

In the exemplary embodiment shown in FIG. 3, the branched channel 62 is formed at least partially by a pipe 66 passing outside the outer casing 20. Moreover, the outer casing 20 is internally provided with a guide member 64A for guiding the steam flow from the upstream portion 26Aa of the first low-pressure turbine blade row to the above-described pipe 66, and a guide member 64B for guiding the steam flow from the pipe 66 to the second low-pressure turbine blade row.

Thus forming the branched channel 62 by the pipe 66 passing outside the outer casing 20, it is possible to implement the steam turbine facility 4 of the double-flow exhaust type and with the single casing structure, by the simple configuration.

In the exemplary embodiments shown in FIGS. 2 and 3, the branched channel 62 is connected to a steam introduction path 46. The steam introduction path 46 is configured to introduce steam having a pressure lower than a pressure of steam in an inlet of the first low-pressure turbine blade row 26A to the branched channel 62.

Thus introducing the steam having the pressure lower than the pressure of the steam in the inlet of the first low-pressure turbine blade row 26A to the branched channel 62 via the steam introduction path 46, the steam with the lower pressure introduced from the steam introduction path 46 to the branched channel 62 is introduced to the second low-pressure turbine blade row 26B, in addition to a part of steam flowing into the inlet of the first low-pressure turbine blade row 26A (for example, exhaust air from the intermediate-pressure turbine, or steam from a low-pressure drum or a low-pressure evaporator of the boiler). Therefore, it is possible to improve output power of the steam turbine facility 4.

Note that in the embodiments shown in FIGS. 2 and 3, since the branched channel 62 is formed by using the outer casing 20 and the pipe 66 passing outside the outer casing 20, it is possible to easily connect the steam introduction path 46 to the branched channel 62, outside the outer casing 20.

Moreover, in the exemplary embodiments shown in FIGS. 2 and 3, the high-pressure turbine blade row 22 and the intermediate-pressure turbine blade row 24 are disposed such that the steam flowing through the high-pressure turbine blade row 22 and the steam flowing through the intermediate-pressure turbine blade row 24 flow in opposite directions to each other in the axial direction, and the first low-pressure turbine blade row 26A and the second low-pressure turbine blade row 26B are disposed such that the steam flowing through the first low-pressure turbine blade row 26A and the steam flowing through the second low-pressure turbine blade row 26B flow in opposite directions to each other in the axial direction.

Thus disposing the respective turbine blade rows such that the steam flowing through the high-pressure turbine blade row 22 and the steam flowing through the intermediate-pressure turbine blade row 24 flow in the opposite directions to each other in the axial direction, and the steams flowing through the pair of low-pressure turbine blade rows 26A, 26B, respectively, flow in the opposite directions to each other in the axial direction, it is possible to balance a thrust load acting on the rotor shaft 28.

Figure 4:
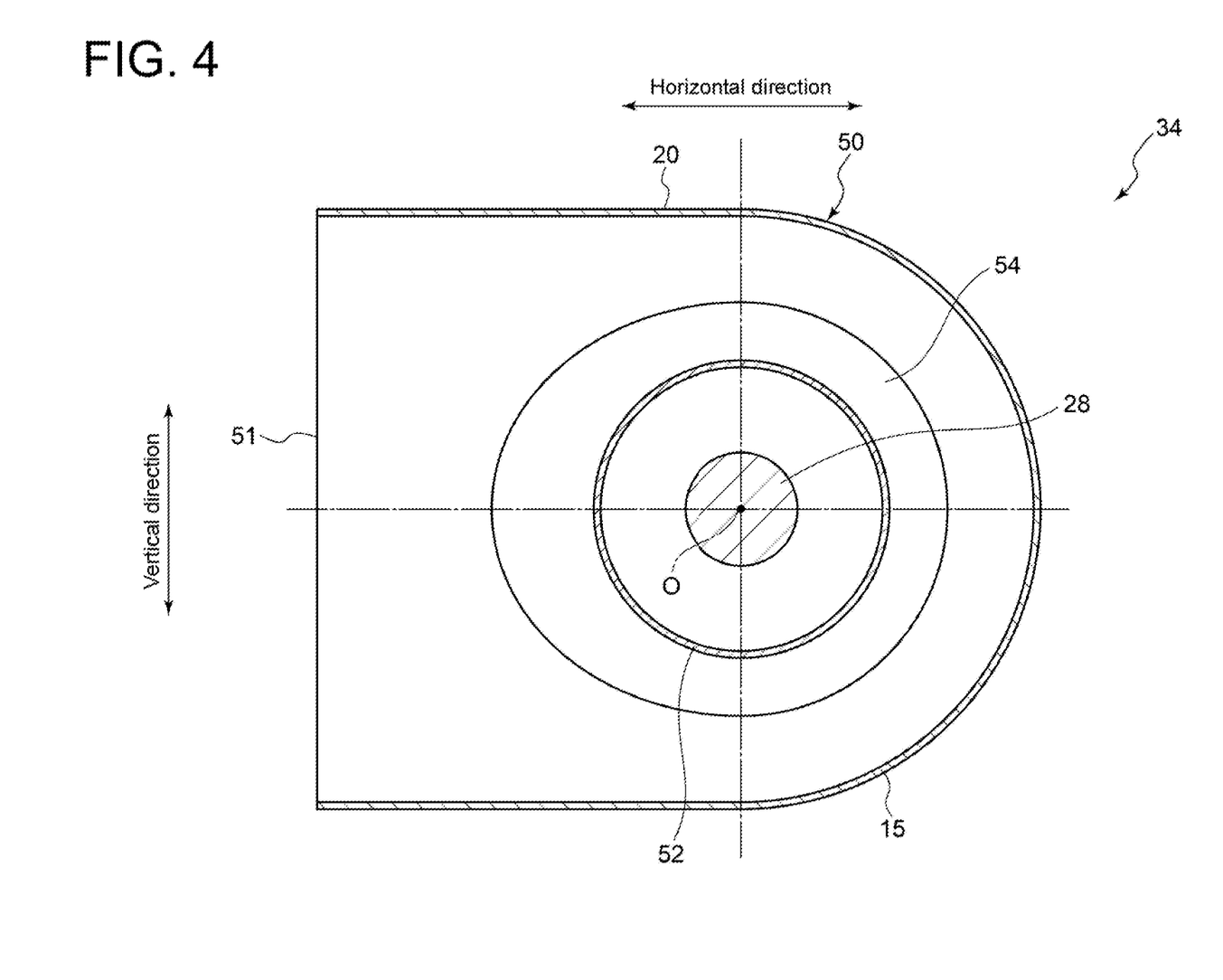
FIG. 4 is a cross-sectional view taken along line A-A in FIG. 2.

FIG. 4 is a schematic cross-sectional view of the exhaust chamber 50 for the steam turbine facility 4 according to an embodiment, and is a cross-sectional view taken along line A-A of FIG. 2.

In some embodiments, as shown in FIG. 4, the exhaust chamber 50 for the steam turbine facility 4 may include the exhaust chamber outlet 51 positioned on the lateral side thereof.

The lateral side of the exhaust chamber 50 refers to a direction away from the center axis O of the rotor shaft 28 in the horizontal direction, when the exhaust chamber 50 is viewed from the axial direction (see FIG. 4).

In this case, the steam having passed through the low-pressure turbine blade row 26A, 26B is laterally exhausted toward the condenser 34 via the exhaust chamber outlet 51 disposed on the lateral side of the exhaust chamber 50. That is, since the condenser 34 can be disposed on the lateral side of the exhaust chamber 50, it is possible to reduce the size of the steam turbine facility 4 in the height direction, as compared with a case in which the condenser 34 is positioned below the exhaust chamber 50. Therefore, it is possible to reduce the facility cost of the steam turbine facility 4 more effectively.

Embodiments of the present invention were described in detail above, but the present invention is not limited thereto, and also includes an embodiment obtained by modifying the above-described embodiments and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

REFERENCE SIGNS LIST

1 Combined cycle plant
2 Gas turbine facility
4 Steam turbine facility
6 Heat recovery steam generator
7 Stator vane
8 Rotor blade
10 Compressor
12 Combustor
14 Turbine
16 Rotational shaft
18 Generator
20 Outer casing
20a Inner circumferential surface
22 High-pressure turbine blade row
24 Intermediate-pressure turbine blade row
26A First low-pressure turbine blade row
26Aa Upstream portion
26Ab Downstream portion
26B Second low-pressure turbine blade row
28 Rotor shaft
30A Radial bearing
30B Radial bearing
32 Generator
34 Condenser
36 Inner casing
36a Outer circumferential surface
38 High-pressure inlet pipe
40 High-pressure outlet pipe
42 Intermediate-pressure inlet pipe
44 Low-pressure inlet pipe
46 Steam introduction path
48 Guide member
50 Exhaust chamber
51 Exhaust chamber outlet
54 Flow guide
56 Insulator
58 Insulator
59 Insulator
60 Seal part
61 Seal part 62 Branched channel
64A Guide member
64B Guide member
66 Pipe

The invention claimed is:

1. A steam turbine facility, comprising:
a rotor shaft;
a pair of radial bearings for rotatably supporting the rotor shaft;
a pair of low-pressure turbine blade rows disposed on the rotor shaft in a bearing span of the pair of radial bearings;
a high-pressure turbine blade row and an intermediate-pressure turbine blade row disposed on the rotor shaft in the bearing span and positioned between the pair of low-pressure turbine blade rows; and
a branched channel for introducing a part of steam flowing through a first low-pressure turbine blade row which is one of the pair of low-pressure turbine blade rows to an inlet of a second low-pressure turbine blade row which is the other of the pair of low-pressure turbine blade rows.

2. The steam turbine facility according to claim 1, further comprising:
an inner casing for accommodating the high-pressure turbine blade row and the intermediate-pressure turbine blade row; and
an outer casing for accommodating the inner casing and at least a part of the pair of low-pressure turbine blade rows,
wherein the branched channel is formed at least partially by an outer circumferential surface of the inner casing and an inner circumferential surface of the outer casing.

3. The steam turbine facility according to claim 2,
wherein an insulator is disposed on the outer circumferential surface of the inner casing.

4. The steam turbine facility according to claim 1, further comprising:
an inner casing for accommodating the high-pressure turbine blade row and the intermediate-pressure turbine blade row; and
an outer casing for accommodating the inner casing and at least a part of the pair of low-pressure turbine blade rows,
wherein the branched channel is formed at least partially by a pipe passing outside the outer casing.

5. The steam turbine facility according to claim 1, further comprising:
a steam introduction path connected to the branched channel, for introducing steam having a pressure lower than a pressure of steam in an inlet of the first low-pressure turbine blade row.

6. The steam turbine facility according to claim 1,
wherein the steam turbine is configured such that steam flowing through the high-pressure turbine blade row and steam flowing through the intermediate-pressure turbine blade row flow in opposite directions to each other in an axial direction, and
wherein the steam turbine is configured such that steams flowing through the pair of low-pressure turbine blade rows, respectively, flow in opposite directions to each other in the axial direction.

7. The steam turbine facility according to claim 1, further comprising:
an exhaust chamber for discharging steams from the pair of low-pressure turbine blade rows toward a condenser,
wherein the exhaust chamber has an exhaust chamber outlet through which steam is discharged to a direction away from a center axis of the rotor shaft in a horizontal direction.

8. The steam turbine facility according to claim 1, further comprising:
a condenser for condensing steams from the pair of low-pressure turbine blade rows.

9. A combined cycle plant, comprising:
a gas turbine facility;
a boiler for generating steam by heat of a discharged gas from the gas turbine facility; and
the steam turbine facility according to claim 1,
wherein the steam turbine facility is configured to be driven by the steam generated by the boiler.

* * * * *